Jan. 2, 1923. 1,440,978
J. FEIGEN.
INSULATION.
FILED JULY 22, 1921.
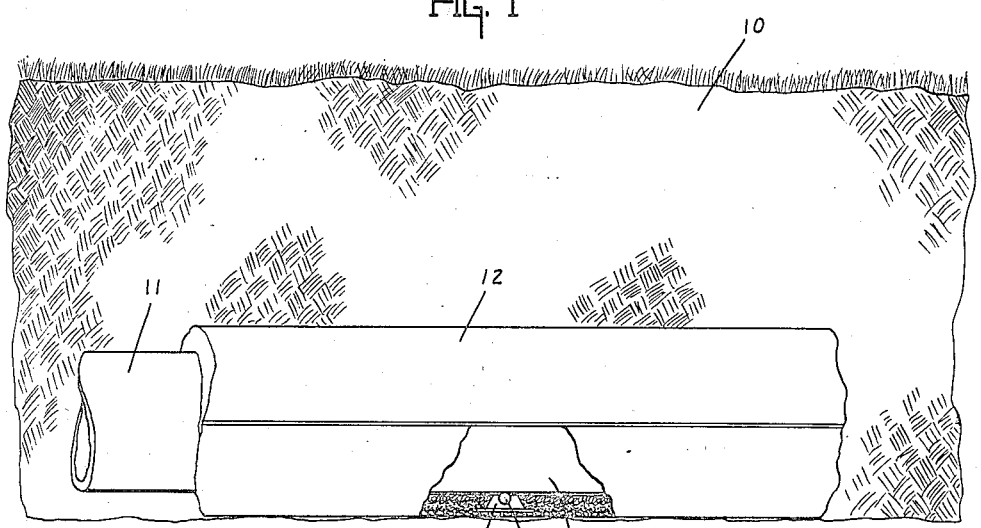
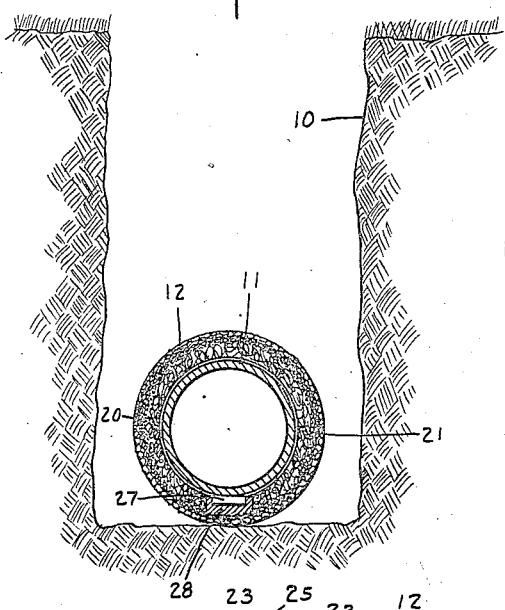
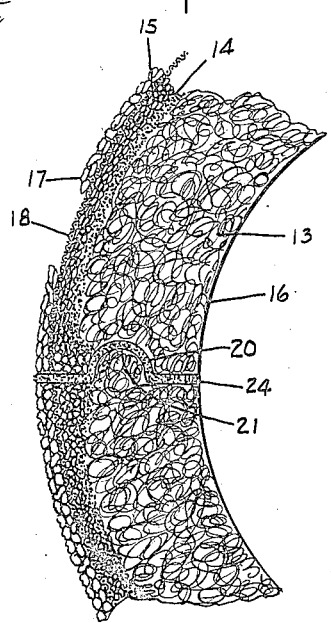
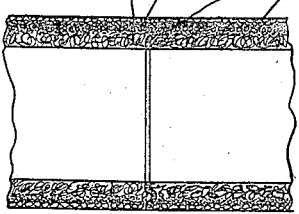
JOHN FEIGEN.
INVENTOR.
BY
ATTORNEYS.

Patented Jan. 2, 1923.

1,440,978

UNITED STATES PATENT OFFICE.

JOHN FEIGEN, OF INDIANAPOLIS, INDIANA.

INSULATION.

Application filed July 22, 1921. Serial No. 486,868.

*To all whom it may concern:*

Be it known that I, JOHN FEIGEN, a citizen of the United States, and a resident of Indianapolis, county of Marion, and State of Indiana, have invented a certain new and useful Insulation; and I do hereby declare that the following is a full, clear, and exact description thereof, reference being had to the accompanying drawings, in which like numerals refer to like parts.

This invention relates to moulded insulation and may be adapted for use for conduits and the like. The chief object of the invention is to provide a moulded and sectionalized insulation which can be associated with other similar sections so that the same interlock to form a complete insulating cover upon a surface to be protected from the transfer of heat or electricity.

The chief object of the invention consists in forming the insulating sections of material both non-conducting of heat and electricity and yielding, whereby inequalities of the surface sought to be insulated and the expansion or contraction thereof is compensated for.

Another feature of the invention consists in providing an exposed roughened surface upon the insulation which does not crack or chip when struck, which is somewhat yielding, and provides an engaging surface for the surrounding fillers.

Still another feature of the invention consists in providing a roller bearing in the inner surface which permits the free movement of the enclosed surface during its expansion and contraction, said bearing to be supported by a bracket secured in the more hardened portion of the outer periphery of said cover.

The full nature of this invention will be understood from the accompanying drawings and the following description and claims:

In the drawings, Fig. 1 illustrates a longitudinal section of a trench in which a pipe is to be buried and upon which is provided suitable heat insulating means embodying the features of the invention. Fig. 2 is a cross sectional view of the trench and illustrates the insulation joints. Fig. 3 is an enlarged detailed sectional view of the insulation and of one of the joints between two similar sections. Fig. 4 is a longitudinal sectional view of a portion of the insulating means and illustrates a joint between two adjacent sections.

In the drawings 10 indicates the wall of a trench, in the bottom of which is positioned a suitable pipe or conduit 11. The pipe or conduit 11 is adapted to convey hot water or steam, such that its temperature normally is higher than the temperature of the earth surrounding the same in the trench, or said pipe may be adapted to convey cool brine, ammonia and other liquids or gases which may be at a temperature lower than the earth surrounding the pipe. In either of the foregoing cases, to prevent the transfer of heat between the surrounding ground and the pipe and the contents thereof, suitable insulating means is provided which, in the present instance, is shown as a section 12. The broad idea of insulating pipes or surfaces with sectionalized heat insulating means adapted to interlock with each other is old in the art, but the invention consists in the particular insulating means described herein, and the particular interlocking connections between the insulating sections also described herein.

Before describing the insulation when assembled, the construction and material of a single section of insulation material will be given, and since all sections are similar a description of one will suffice for an understanding of all of the sections. In Fig. 3 there is illustrated in detail the insulation which comprises an inner heat and electrical insulating layer 13. This insulating layer is also resilient and yielding and as an example of material which embodies both of said features the same may be made of a waterproof mineral wool which is termed "rock cork". The fibres of the mineral wool are held together by a small amount of cementitious material which simply maintains said fibres in the form illustrated or in any other shape as desired, but does not make the same rigid. The outer surface of the layer 13 is provided with a cementitious layer 14 and upon the layer 14 is suitably secured, by other or the same cementitious material, crushed stone such as quartz or granite and the like 15. Suitably embedded between the inner wall 16 and the outer wall 17 of the completed insulating material is a perforated metallic reenforcing layer 18. In Fig. 3 the reenforcing layer is illustrated positioned in the crushed rock section of the insulating material, When the insulation is constructed as shown it will be understood that the reenforcing layer associated with the crushed rock also prevents casual injury of the conduit within said insulation, and also gives rigidity to the exterior or exposed surface of said insulation. It will be understood that since the layer 13 of the insulating material is yielding or resilient, inequalities of the surface to be insulated are received by said layer and accommodated thereby such that the layer 13 is in contact with substantially the entire surface adjacent thereto which it is desired to insulate from the transfer of heat or electrical conductivity.

While in the drawings the surface to be covered is illustrated as a pipe, the broad idea of the invention consists in forming the sections of insulating material with interlocking tongue and groove connections and providing the joints therebetween with a cementitious material to fill the same and secure said sections together. As illustrated in the drawings, the section 12 is provided with a groove 20 on one longitudinal edge and upon the other longitudinal edge there is provided with a complementary-formed tongue 21. The tongues 21 of adjacent sections are adapted to be received by the grooves 20 of adjacent sections to interlock and form a complete surface. Each transverse edge of the section 12 is provided with a similar tongue and groove connection, the groove portion being indicated by the numeral 22, and the tongue by the numeral 23, said tongue and groove connection upon adjacent transverse sections being adapted to interlock to form the complete surface. While the invention has been illustrated as showing an insulating covering for a conduit or pipe 11 as sectionalized medianly of said pipe, it will be understood that the sections may be so constructed that two or more sections will comprise and form the completed conduit insulation.

Between the complementary tongue and groove connections 20 and 21 and 22 and 23 there is a layer of cementitious material 24 and 25 respectively which is adapted to secure the sections together to form a complete insulating cover upon the surface which it is desired to protect from the transfer of heat.

When the invention is applied to a conduit 11, as shown, and the same is supplied with steam, the temperature of the conduit increases. Heretofore said expansion has cracked the insulation material employed. In the present instance, however, since the layer 13 is yielding or resilient, such expansion is accommodated by said layer so that the joints 24 and 25 are not disturbed and no cracks will be formed in the crushed stone wall or layer 15. The perforated metallic layer 18 reenforces said wall and surface to compel the resilient wall 13 to accommodate itself to the inequalities of the surface to be covered as well as the expansions and contractions thereof.

For readily permitting the expansion and contraction of the pipe 11, there is provided a roller bearing 27 between the inner wall 16 and the adjacent surface of said pipe. The roller 27 protrudes only slightly beyond the inner wall 16, and is supported thereby by the bracket 28 which extends through the more resilient and flexible portion of the wall, and is seated and rigidly secured in the hardened shell portion 15.

The invention claimed is:

1. An insulation having its main portion consisting of a thermal non-conducting material, a coating of binding material on the surface of said non-conducting material and adhering thereto, a crushed stone layer secured by said binding material coating to form a hard external surface for said non-conducting material, and a reenforcing metallic layer between the inner and outer walls of said insulation.

2. An insulation having its main portion consisting of a thermal non-conducting material, a small amount of binding material therein so that said main portion will maintain its shape and yet be resilient and yielding, a coating of binding material on the surface of said non-conducting material and adhering thereto, a layer of crushed stone secured to said binding material coating to form a hard external surface for said main portion, and a reenforcing layer between the inner and outer walls of said insulation.

3. An insulation having its main portion consisting of a thermal non-conducting material, a small amount of binding material therein so that said main portion will maintain its shape and yet be resilient and yielding, a coating of binding material on the surface of said non-conducting material and adhering thereto, a layer of crushed stone secured to said binding material coating to form a hard external surface for said main portion, and a perforated metallic reenforcing layer embedded in said crushed stone layer.

4. The combination with a pipe to be insulated, of an insulation having its main portion consisting of a thermal non-conducting material, a small amount of binding material therein so that said main portion will maintain its shape and yet be resilient and yielding, a coating of binding material on the surface of said non-conducting material and adhering thereto for forming a hardened outer shell, and a roller bearing mounted in said insulation upon which the pipe rests for permitting the free expansion and contraction thereof.

5. The combination with a pipe to be insulated, of an insulation having its main portion consisting of a thermal non-conducting material, a small amount of binding material therein so that said main portion will maintain its shape and yet be resilient and yielding, a coating of binding material on the surface of said non-conducting material and adhering thereto for forming a hardened outer shell, a roller bearing upon which the pipe rests for permitting the free expansion and contraction thereof, and a bracket for supporting said bearing formed in said insulation and rigidly anchored and supported by said hardened outer shell.

In witness whereof, I have hereunto affixed my signature.

JOHN FEIGEN.